US008220045B2

(12) United States Patent
Conti et al.

(10) Patent No.: US 8,220,045 B2
(45) Date of Patent: Jul. 10, 2012

(54) SYSTEM AND METHOD OF IDENTIFYING AND PREVENTING SECURITY VIOLATIONS WITHIN A COMPUTING SYSTEM

(75) Inventors: Gregory Remy Philippe Conti, Saint Paul (FR); Jerome Laurent Azema, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 2151 days.

(21) Appl. No.: 10/961,344

(22) Filed: Oct. 8, 2004

(65) Prior Publication Data
US 2006/0021035 A1 Jan. 26, 2006

(30) Foreign Application Priority Data
Jul. 23, 2004 (EP) .................................. 04291893

(51) Int. Cl.
*G06F 21/00* (2006.01)
(52) U.S. Cl. ........................................................ 726/17
(58) Field of Classification Search .................. None
See application file for complete search history.

(56) References Cited

U.S. PATENT DOCUMENTS

| 6,115,819 | A  | * | 9/2000  | Anderson ..................... 726/20 |
| 6,141,757 | A  |   | 10/2000 | Seeker et al. |
| 6,321,314 | B1 |   | 11/2001 | Van Dyke |
| 6,646,564 | B1 | * | 11/2003 | Azieres et al. ............... 340/679 |
| 7,401,358 | B1 | * | 7/2008  | Christie et al. ................. 726/21 |
| 7,426,644 | B1 | * | 9/2008  | Strongin et al. .............. 713/193 |
| 7,487,367 | B2 | * | 2/2009  | Belnet et al. ................. 713/194 |
| 7,624,439 | B2 | * | 11/2009 | Koestler .......................... 726/16 |
| 7,840,763 | B2 | * | 11/2010 | Murotake et al. ............ 711/153 |
| 7,849,310 | B2 | * | 12/2010 | Watt et al. .................... 713/164 |
| 2011/0173409 | A1 | * | 7/2011  | Sibert ............................ 711/163 |

FOREIGN PATENT DOCUMENTS

EP          0 897 144 A2      2/1999

OTHER PUBLICATIONS

"The Pentium FOOF Bug", Robert R. Collins, Online, Dec. 17, 2000, Retrieved from the Internet: URL:http://web.arcihve.org/web/20001217210300/http://www.rcollins.org/ddj/May98/FOOF Bug.html> retrieved on Dec. 20, 2004, pp. 4.
Intel: "386 DX Microprocessor Programmer's Reference Manual", Jun. 19, 1991, Intel, XP002311519, Exceptions and Interrupts, pp. 23.

* cited by examiner

*Primary Examiner* — Minh Dinh
(74) *Attorney, Agent, or Firm* — Ronald O. Neerings; Wade James Brady, III; Frederick J. Telecky, Jr.

(57) ABSTRACT

A system and method of identifying and preventing security violations within a computing system. Some exemplary embodiments may be a method comprising monitoring activity on a core bus coupled to a processor core (the processor core operating in a computing system), identifying activity on the core bus as a security violation, and preventing execution of an instruction within the processor core in response to the security violation.

21 Claims, 3 Drawing Sheets

SYSTEM AND METHOD OF IDENTIFYING AND PREVENTING SECURITY VIOLATIONS WITHIN A COMPUTING SYSTEM

BACKGROUND OF THE INVENTION

1. Technical Field

The present subject matter relates to detecting in-progress execution of malicious programs in microprocessor-based system. In some cases execution of the malicious program may be stopped and the user notified by visual and/or audible notification that an attack has been detected.

2. Background

Many microprocessor-based consumer electronic devices are designed with two levels of privilege: one for the operating system (O/S); and the other for user software applications. In some microprocessor-based systems the two privilege levels do not provide adequate security, mainly due to the fact that effective implementation of the operating system privilege level (sometimes referred to as protected mode) relies on proper operation of the O/S software. Such reliance on the proper operation of the O/S software can leave a system potentially vulnerable to malicious programs such as computer viruses.

Some microprocessor-based systems have addressed this issue by implementing a third "secure" level of operation, implemented in hardware. This security hardware can block software access to at least some hardware components (e.g., memory, memory management units, and cache registers). The security hardware may monitor the system for security violations and reset the entire system if any such violations are detected. However, causing a reset of the system itself can be an attack, and if the reset of the system is frequent, the system may be unusable. An attack such as this is what is sometimes referred to as a "denial of service" (DoS) attack.

Accordingly, a system capable of detecting and stopping an attack without resorting to such extreme measures as resetting the system is desirable.

SUMMARY OF SOME OF THE PREFERRED EMBODIMENTS

The problems noted above are addressed in large part by a system and method of identifying and preventing security violations within a computing system. Some exemplary embodiments may include a method comprising monitoring activity on a core bus coupled to a processor core (the processor core operating in a computing system), identifying activity on the core bus as a security violation, and preventing execution of an instruction within the processor core in response to the security violation.

Other exemplary embodiments may include a method comprising tracking activity on a core bus of a processor core of a computing system, recognizing activity on the core bus as a security violation, asserting an interrupt signal to the processor core in response to the security violation, and executing security response software in response to the asserted interrupt signal.

Yet further exemplary embodiments may include a computing system comprising a processor core coupled to a primary bus, and a monitoring system coupled to the primary bus (the monitoring system tracks an activity on the primary bus). The monitoring system recognizes a security violation comprising the activity on the primary bus caused by a program executing on the processor core, and blocks completion of the activity by causing a flush of pipeline stages of the processor core.

Yet further exemplary embodiments may include a computing system comprising a monitoring system, a plurality of computing system components, and a firewall system (the firewall system adapted to monitor an attempted access to at least one of the plurality of system components and coupled between the plurality of computing system components and the monitoring system). The firewall system recognizes as a security violation a violation of at least one of a plurality of stored firewall constraints, and blocks the attempted access if the attempted access is recognized as the security violation.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
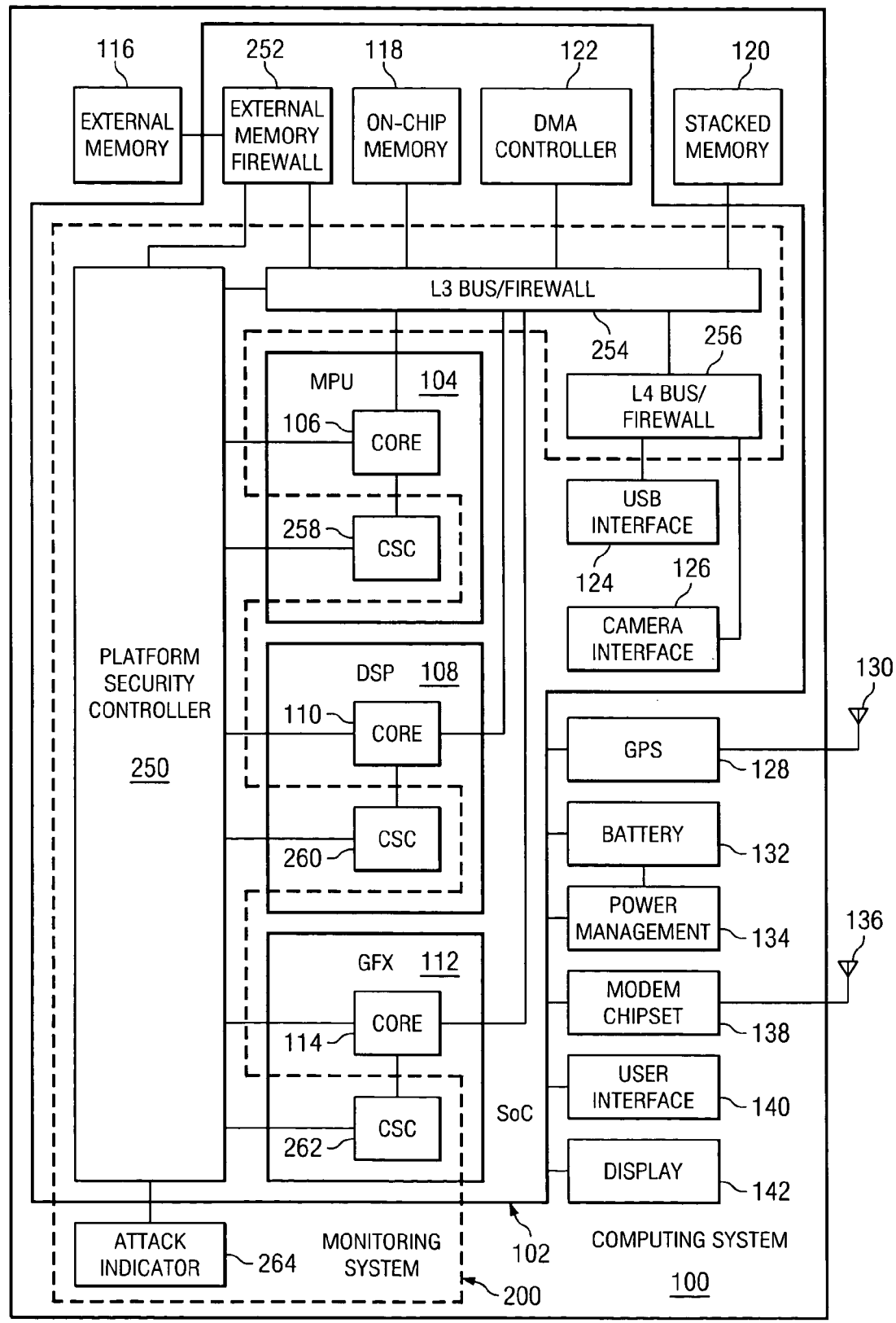
FIG. 1 illustrates a computing system constructed in accordance with at least some embodiments of the invention.

FIG. 1 shows a computing system 100 constructed in accordance with at least some embodiments of the invention. The computing system 100 may comprise a multiprocessing unit (MPU) 104 coupled to various other system components by way of data and instruction busses and security firewalls (e.g., L3 bus/firewall 254, L4 bus/firewall 256, and external memory firewall 252). The MPU 104 may comprise a processor core (core) 106 that executes programs, possibly by having a plurality of processing pipelines. The MPU 104 may further comprise a core security controller (CSC) 258, which aids in allowing the MPU 104 to enter a secure mode for execution of secure programs on the core 106. The core security controller 258 may further monitor operation during the secure mode to ensure secure operation, and during non-secure mode to prevent access to secure components of the computing system 100.

The computing system 100 may further comprise a digital signal processor (DSP) 108 coupled to the MPU 104 by way of the L3 bus/firewall 254. The DSP 108 may aid the MPU 104 by performing task-specific computations, such as graphics manipulation and speech processing. The DSP 108 may have its own core 110 and its own core security controller 260. A graphics accelerator (GFX) 112 may also couple both to the MPU 104 and the DSP 108 by way of the L3 bus/firewall 254. The graphics accelerator 112 may perform necessary computations and translations of information to allow display of information, such as on display device 142. The graphics accelerator 112, like the MPU 104 and the DSP 108, may have its own core 114 and its own core security controller 262. As with the MPU 104, both the DSP 108 and the graphics accelerator 112 may each independently enter a secure mode to execute secure programs on core 110 and core 114 respectively.

The computing system 100 may further comprise a direct memory access controller (DMA CTLR) 122 coupled to on-chip memory 118 and stacked memory 120 by way of the L3 bus/firewall 254, and to external memory 116 by way of the L3 bus/firewall 254 and the external memory firewall 252. The direct memory access controller 122 may control access to and from the on-chip memory 118, the stacked memory 120, and the external memory 116 by any of the other system components such as, for example, the MPU 104, the DSP 108 and the graphics accelerator 112. The on-chip memory 118, stacked memory 120, and external memory 116 may be any suitable memory, such as synchronous RAM, RAMBUS™-type RAM, programmable ROMs (PROMs), erasable programmable ROMs (EPROMs), and electrically erasable programmable ROMs, (EEPROMs). The stacked memory may be any suitable memory that is integrated within the same semiconductor package as system-on-a-chip (SoC) 102, but on a semiconductor die separate from the semiconductor die of the system-on-a-chip 102.

The computing system 100 may further comprise a USB interface (USB I/F) 124 coupled to the various system components by way of the L4 bus/firewall 256. The USB interface 124 may allow the computing system 100 to couple to and communicate with external devices.

Each of the core security controllers (e.g., core security controller 258) may be implemented as a hardware-based state machine that monitors system parameters of each of the respective processor cores (e.g., core 106). A core security controller allows the secure mode of operation to initiate for a processor such that secure programs may execute from secure memory (e.g., from a secure address range of the on-chip memory 118) and access secure resources (e.g., control registers for secure channels of the direct memory access controller 122). Having this secure mode, or third level of privilege, is valuable for any type of computer system, such as a laptop computer, a desktop computer, or a server in a bank of servers. However, in accordance with at least some embodiments of the invention, the computing system 100 may be a mobile computing system, e.g., a cellular telephone, personal digital assistant (PDA), text messaging system, and/or a computing device that combines the functionality of a messaging system, personal digital assistant and a cellular telephone. Thus, some embodiments may comprise a modem chipset 138 coupled to an external antenna 136 and/or a global positioning system (GPS) circuit 128 likewise coupled to an external antenna 130.

Because the computing system 100 in accordance with at least some embodiments is a mobile device, computing system 100 may also comprise a battery 132 providing power to the various processing elements, possibly controlled by a power management unit 134. A user may input data and/or messages into the computing system 100 by way of the user interface (User I/F) 140, such as a keyboard, keypad, or touch panel. Because many cellular telephones also comprise the capability of taking digital still and video pictures, in some embodiments the computing system 100 may comprise a camera interface (CAM I/F) 126 which may enable camera functionality, possibly by coupling the computing system 100 to a charge-coupled device (CCD) array (not shown) for capturing digital images.

The various firewalls of the system 100 illustrated in FIG. 1 each provide additional protection beyond the protection provided by the core security controllers. A firewall may block or allow access to a component of the computing system 100 by another component (or by software executing on that component) depending on a set of programmed rules. The rules establish relationships between pairs of components and the mode of operation (e.g., secure or non-secure). Such rules may be implemented either in hardware or software in the form of a permission table, wherein the component attempting access is crossed-referenced to an address range of the component to which access is desired. If the resulting permission for the requested operation and for the current mode of operation is a denial of access, the firewall signals a security violation.

The firewalls 252, 254 and 256 and the core security controllers 258, 260 and 262, as well as the security indicator 264, each couple to the platform security controller 250. The platform security controller 250 acts as a hub for the detection of security violations. The core security controllers and the firewalls each may assert individual security violation signals monitored by the platform security controller 250. If the platform security controller detects an assertion of any of the individual security violation signals, it may respond by causing one or more core security controllers to initiate a security response sequence (described below). The platform security controller may also alert the user of the computing system 100 that a violation has been detected, such as by activating the attack indicator 264.

Figure 2:
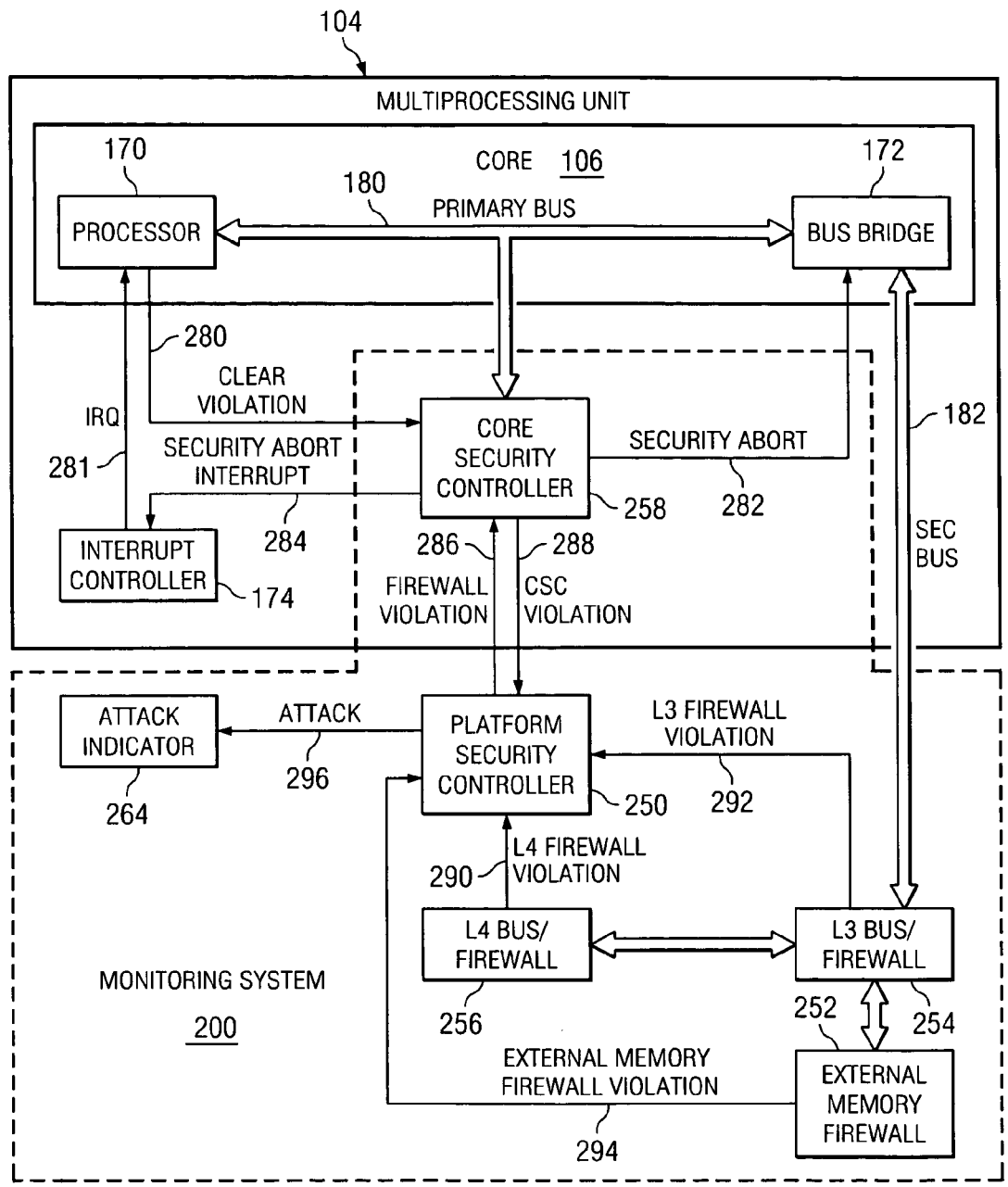
FIG. 2 illustrates a monitoring system constructed in accordance with at least some embodiments of the invention.

The various security components described operate as monitoring system 200, which comprises the platform security controller 250, the firewalls 252, 254 and 256, the core security controllers 258, 260 and 262, and the attack indicator 264. FIG. 2 illustrates in greater detail the monitoring system 200, depicting an illustrative configuration that couples components within the monitoring system 200 to components within the MPU 104. The MPU 104, in accordance with at least some embodiments of the invention, comprises the core 106, an interrupt controller 174, a secondary bus 182, and the core security controller 258 (overlapping with the monitoring system 200 which also comprises the core security controller 258). Core 106 comprises a processor 170, a primary bus 180 (the native bus of the processor 170), and a bus bridge 172. Processor 170, in accordance with at least some embodiments of the invention, may be any processor suitable for integration into a system on a chip, such as the ARM 1136 series of processors.

The processor 170 couples to the primary bus 180, as does the bus bridge 172 and the core security controller 258. The processor 170 also couples to the core security controller 258, and to interrupt controller 174. The core security controller 258 couples to the bus bridge 172, and to the platform security controller 250. The platform security controller 250 couples to attack indicator 264, the external memory firewall 252, the L3 bus/firewall 254, and the L4 bus/firewall 256. The L4 bus/firewall 256 couples to the L3 bus/firewall 254, and the L3/bus firewall 254 couples to the secondary bus 182.

The core security controller tracks the activity of the processor 170 by monitoring signals on the primary bus 180. These signals may include instruction bus signals, data bus signals, status signals, and control signals. Such signals may be organized as separate busses within the primary bus (e.g., an instruction bus, a data read bus, and a data write bus, as may be found in a Harvard computer architecture). By monitoring such signals on the primary bus 180 the core security controller 258 can determine the actual instruction and data presented to the processor 170 for execution, the security mode of the MPU 104, and whether or not the instruction and/or the data is allowable given the current security mode. Thus, for example, an attempt by a program executing on the processor 170 to access a secure address range of memory while the processor 170 is operating in a non-secure mode will be identified by the core security controller 258 as a security violation. Similarly, an attempt by a program executing on the processor 170 to access a non-secure address range of memory while the processor 170 is operating in a secure mode will also be identified by the core security controller 258 as a security violation.

Other activity on the primary bus 180 may also be identified as a security violation. The core security controller 258 may identify as a security violation access to one resource by another resource, where the two resources have mismatched security levels. Thus, for example, access to a secure address range of the on-chip memory 118 by a non-secure channel of the direct memory access controller 122 will be identified as a security violation. Likewise, access to a non-secure address range of the external memory 116 by a secure channel of the direct memory access controller 122 will also be identified as a security violation. The core security controller 258 may also identify as a security violation an instruction abort sequence presented to the processor 170. Examples of this type of attack may be an attempt by a malicious program to use the instruction abort sequence to interrupt a secure mode entry sequence, or to interrupt software already executing in a secure mode. Both may be identified as a security violation.

Other activity on the system that may be monitored by the security controller 258 may include malicious manipulation of the voltage levels of the electronic communications system 100, malicious manipulation of clock frequencies, deliberate hardware fault injection (e.g., using a laser) and unauthorized test and debug activity (e.g., attempting to place an operational electronic communication system 100 into a test mode). Attempts at any of these activities that are detected by the security controller 258 may also be identified as a security violation.

Once a security violation has been detected the core security controller 258 may initiate a security response sequence. The security response sequence may comprise blocking or stopping execution of the violating operation, blocking future execution of the offending program (e.g., by deleting the program from the computing system 100), or possibly both actions. Each of these will be addressed in turn.

The core security controller 258, in accordance with at least some embodiments of the invention, may abort an instruction presented to the processor 170 on the primary bus 180 if the instruction or data associated with the instruction violates a security constraint programmed into the core security controller 258. The core security controller 258 may assert security abort signal 282, which the bus bridge 172 converts to a native processor hardware-based abort. The hardware-based abort prevents the offending instruction from executing and also may flush prefetch units, internal instruction and/or data prediction mechanisms, and pipeline stages of the processor 170 that may contain additional program instructions that are part of a violation or attack. Such a flush causes the context of a malicious program to be cleared, which terminates execution of the program. Because the abort is hardware-based and not vulnerable to control or interference by software, a malicious program may have great difficulty intercepting or bypassing a security response sequence thus implemented.

In accordance with at least some embodiments of the invention, the processor 170 may be an ARM 1136 series processor. Such a processor provides the type of hardware-based instruction abort sequence described above needed to prevent execution of an instruction identified as causing a security violation, and also provides the ability to flush all prediction and pipeline stages as part of an abort sequence to prevent execution of any other pre-fetched instructions which may be part of an attack sequence.

The core security controller 258 of FIG. 2 may also respond to a security violation by generating an interrupt to the processor 170. In accordance with at least some embodiments of the invention the core security controller may assert the security abort interrupt signal 284, which is monitored by the interrupt controller 174. In response to the assertion of the security abort interrupt the interrupt controller may assert the interrupt request (IRQ) signal 281, which in turn may initiate an interrupt request to the processor 170.

An interrupt service routine triggered by the interrupt request signal 281 and executed on the processor 170 may launch one or more software programs (e.g., anti-virus software) that can identify the source of the malicious program and prevent future execution of the program (e.g. by deleting the source from the computing system 100). The processor 170 may signal completion of the interrupt service routine to the core security controller 258 by asserting the clear violation signal 280. In accordance with at least some embodiments of the invention, a high-performance, high-priority processor interrupt may be used (e.g., the FIQ interrupt of the ARM 1136 series processor) since it is more difficult for attacking software to bypass the interrupt service routine triggered by such an interrupt.

The core security controller 258 may also respond to a security violation detected by one of the various firewalls of the monitoring system 200. Each of the various firewalls of the monitoring system 200 may assert a firewall violation signal (e.g., L3 firewall violation signal 292) to indicate to the platform controller 250 that a security violation has been detected. The platform controller 250 may respond to a firewall detected security violation by asserting firewall violation signal 286. In some embodiments of the core security controller 258 may respond to the firewall violation indication in the same way as it would in response to a security violation detected by the core security controller 258.

In alternative embodiments the core security controller 258 may respond differently to firewall security violations. Thus, for example, if an attempt is made by a USB device coupled to the USB port 124 (see FIG. 1) to access a secure address range of the on-chip memory 118, the L4 bus/firewall 256 may deny access and notify the platform security controller 250 of the violation. The security platform controller 250 in turn may notify the core security controller 258 of the firewall detected violation, and the core security controller 258 may then signal an interrupt request to the processor 170. The interrupt service routine executed on the processor 170 in response to the interrupt request may then take appropriate action. Such action may be logging the security violation, since access may already have been blocked by the firewall and thus no additional protective or remedial action may be needed.

The firewalls of the monitoring system 200 constructed in accordance with at least some embodiments of the invention may provide isolation between components of the computing system 100 that are capable of operating at different security levels. The firewalls may be integrated into the busses linking the various components of the computing system 100 to provide control over request/response mechanisms within the busses. Such request/response mechanisms may allow components requesting access, sometimes referred to as "initiators," to access other components, sometimes referred to as "targets," but only if access is allowed by the security firewall integrated into the bus coupling the components. Thus, for example, the direct memory access controller 122 may request access to the stacked memory 120, but will only be granted access by the security firewall integrated into the L3 bus/firewall 254 if access does not violate a security constraint.

Further, in accordance with at least some embodiments of the invention the L3 bus firewall 254 may be implemented using digital hardware such that any access request to the direct memory access controller 122 by the graphics controller 112 will always be declined. Such hardware utilizes initiator and target identification information placed on the bus portion of the L3 bus/firewall 254 by the graphics controller 112 as input to the security firewall portion of the L3 bus/firewall 254. Logic within the security firewall decodes the information and determines whether or not access to the target by the initiator is granted (in the example described, access would always be denied). Such a hardware-based firewall may provide a high level of security since it may not be easily reprogrammed or changed.

Other embodiments of the L3 bus/firewall 254 may utilize a memory-based lookup table. In such embodiments a permission table may be implemented as a multi-dimensional table wherein, for example, the initiator identification, target identification, and security mode of the MPU 104 may be used to index into the table and generate a response to an access request. The table may be implemented using any suitable memory. Depending on the type of memory used, varying degrees of flexibility and security may be attained. For example, if a ROM is used, programs executing on the computing system 200 cannot change the security constraints coded in the memory, making the computing system 200 very inflexible, but very secure. By contrast if a RAM is used, programs executing on the computing system 200 may be able to reconfigure the security constraints coded in memory dynamically at run time (appropriately constrained by other security measures built into the system), making the computing system 200 more flexible.

In addition to monitoring firewall-detected violations, the platform security controller 250 may also alert the user when a security violation has occurred. As shown in FIG. 2 and in accordance with at least some embodiments of the invention, the platform security controller 250 may also monitor the core security controller 258 for violations as indicated by CSC violation signal 288. This signal, in combination with similar signal from other core security controllers and firewalls that the monitoring system 200 may include, enables the platform security controller 250 to react to security violations detected by other elements of the monitoring system 200. The platform security controller may then respond to an asserted security violation signal by asserting attack signal 296, which may activate attack indicator 174 to alert the user that a violation, and thus a potential attack on the computing system 100, has occurred.

Figure 3:
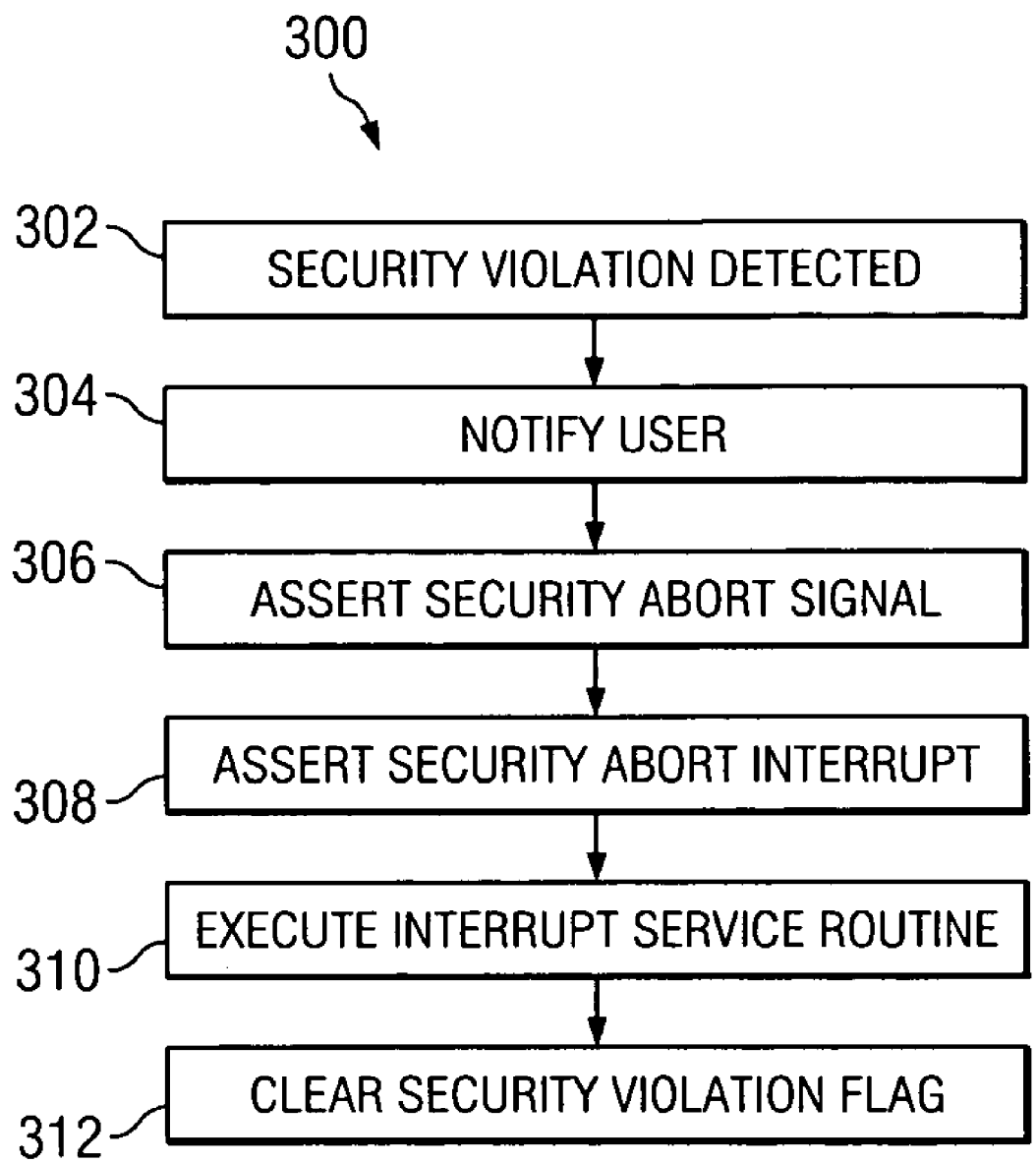
FIG. 3 illustrates a method for stopping an attack in accordance with at least some embodiments of the invention.

FIG. 3 illustrates a method for responding to a security violation, stopping an attack, and notifying a user, suitable for use with the monitoring system 200. Such a method, in accordance with at least some embodiments of the invention, may include a security violation detection block 302, a user notification block 304, a security abort signal assertion block 306, a security abort interrupt assertion block 308, an interrupt service routine execution block 310, and a security violation clearing block 312.

Continuing to refer to FIG. 3, after a security violation has been detected (e.g., by core security controller 110) as shown in block 302, the user may be notified of the violation in block 304 (e.g., by activating the attack indicator 174). After notifying the user of an attempted attack, a security abort signal may be asserted as shown in block 306, which may trigger an abort of an instruction presented for execution to a processor within the monitoring system 200, and which may flush any prediction or pipeline stages associated with said processor. A security abort interrupt may then be asserted as shown in block 308, which may trigger preemptive execution of an interrupt service routine as shown in block 310. The interrupt service routine may in turn address the security violation directly, or may launch one or more software programs (e.g., virus scanner software) that can locate the source of the offending attack instruction and prevent future execution of the instruction by the source (e.g., by deleting the source from the system 100). Once the interrupt service routine of block 310 has completed execution, the violation may be marked as cleared (e.g., by asserting a clear violation signal to the core security controller that originally detected the security violation) as shown in block 312.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    monitoring on a core bus coupled to a processor core at least one of voltage levels, clock frequencies, hardware fault injection and test and debug activity associated with an electronic apparatus;
    identifying unauthorized manipulation of at least one of said voltage levels, clock frequencies, hardware fault injection and test and debug activity as a security violation; and
    preventing execution of an instruction within the processor core in response to the security violation.

2. The method of claim 1, further comprising:
    identifying a software program executing on the processor core as causing the security violation; and
    preventing the software program from executing.

3. The method of claim 1, further comprising activating a visual indicator to notify the user that the security violation has been detected.

4. The method of claim 1, further comprising activating a visual indicator to notify the user that the security violation has been neutralized.

5. The method of claim 1, further comprising activating an audible indicator to notify the user that the security violation has been detected.

6. A method, comprising:
    monitoring activity on a core bus coupled to a processor core, the processor core operating in a computing system;
    identifying activity on the core bus as a security violation;
    identifying as the security violation software initiating an attempted access of a non-privileged resource by a privileged resource of the computing system;
    preventing access to the non-privileged resource; and
    preventing future execution of the software.

7. A method, comprising:
    tracking activity on a core bus of a processor core of a computing system;

recognizing activity on the core bus as a security violation said activity comprising more than one of instruction bus signals, data bus signals, status signals and control signals;
recognizing as the security violation an attempted access of a privileged resource by a non-privileged resource of the computing system;
asserting an interrupt signal to the processor core in response to the security violation;
executing security response software in response to the asserted interrupt signal;
blocking execution of an instruction within the processor core in response to execution of the security response software; and
preventing future execution of a program requesting the attempted access.

8. A method, comprising:
tracking activity on a core bus of a processor core of a computing system;
recognizing activity on the core bus as a security violation said activity comprising more than one of instruction bus signals, data bus signals, status signals and control signals;
recognizing as the security violation an attempted access of a privileged resource by a non-privileged resource of the computing system;
asserting an interrupt signal to the processor core in response to the security violation;
executing security response software in response to the asserted interrupt signal;
ending execution of a program requesting the attempted access in response to the security violation; and
preventing future execution of the program requesting the attempted access.

9. A method, comprising:
tracking activity on a core bus of a processor core of a computing system;
recognizing activity on the core bus as a security violation said activity comprising more than one of instruction bus signals, data bus signals, status signals and control signals;
recognizing as the security violation an attempted access of a privileged resource by a non-privileged resource of the computing system;
asserting an interrupt signal to the processor core in response to the security violation;
executing security response software in response to the asserted interrupt signal;
activating a visual indicator to signal the user that the security violation has been detected; and
preventing future execution of a program requesting the attempted access.

10. A method, comprising:
tracking activity on a core bus of a processor core of a computing system;
recognizing activity on the core bus as a security violation said activity comprising more than one of instruction bus signals, data bus signals, status signals and control signals;
recognizing as the security violation an attempted access of a privileged resource by a non-privileged resource of the computing system;
asserting an interrupt signal to the processor core in response to the security violation;
executing security response software in response to the asserted interrupt signal;
activating an audible indicator to signal the user that the security violation has been detected; and
preventing future execution of a program requesting the attempted access.

11. A computing system, comprising:
a processor core coupled to a primary bus; and
a monitoring system coupled to the primary bus, the monitoring system tracks an activity on the primary bus;
wherein the monitoring system recognizes as a security violation activity on the primary bus caused by a program executing on the processor core;
wherein the monitoring system blocks completion of activity initiated by the program by causing a flush of the processor core; and
wherein the monitoring system blocks future execution of the program.

12. The computing system of claim 11, wherein causing a flush of the processor core comprises flushing a stage within the processor core, the stage comprising at least one of the group consisting of a prefetch stage, a prediction stage, or a pipeline stage.

13. The computing system of claim 11, wherein the monitoring system further activates an interrupt signal to the processor core that triggers execution of security response software that blocks execution of the program.

14. The computing system of claim 13,
wherein the processor core operates in a secure mode and a non-secure mode; and
wherein the processor core further enters into a secure mode upon execution of the security response software if the security violation occurs while in the non-secure mode.

15. The computing system of claim 11, further comprising:
a secure component coupled to the primary bus;
wherein the processor core operates in a secure and a non-secure mode; and
wherein the security violation further comprises an attempt to access the secure component while in the non-secure mode.

16. The computing system of claim 15, wherein the secure component comprises at least one of the group consisting of a direct memory access controller, a processor pipeline, or a memory.

17. The computing system of claim 11, further comprising:
a non-secure component coupled to the primary bus;
wherein the processor core operates in a secure and a non-secure mode; and
wherein the security violation comprises attempting to access the non-secure component while in the secure mode.

18. The computing system of claim 17, wherein the non-secure component comprises at least one of the group consisting of an external memory, a global positioning system receiver, a universal bus serial interface, a camera interface, a user interface, a display, or a modem.

19. The computing system of claim 11, further comprising an attack indicator, wherein the recognition of the security violation causes the attack indicator to be activated.

20. The computing system of claim 11, wherein the processor core comprises at least one of the group consisting of an ARM processor, a digital signal processor, or a graphics display processor.

21. A computing system, comprising:
a processor core coupled to a primary bus; and
a monitoring system coupled to the primary bus, the monitoring system tracks an activity on the primary bus;

wherein the monitoring system recognizes as a security violation activity caused by a program presenting an instruction abort sequence to the processor core;

wherein the monitoring system blocks completion of the activity by causing a flush of the processor core; and wherein the monitoring system blocks future execution of the program.

* * * * *